Sept. 12, 1967     C. HOLLINSHEAD ET AL     3,340,947
FRONT WHEEL DRIVE MOTORCYCLE
Filed Aug. 16, 1965     2 Sheets-Sheet 1
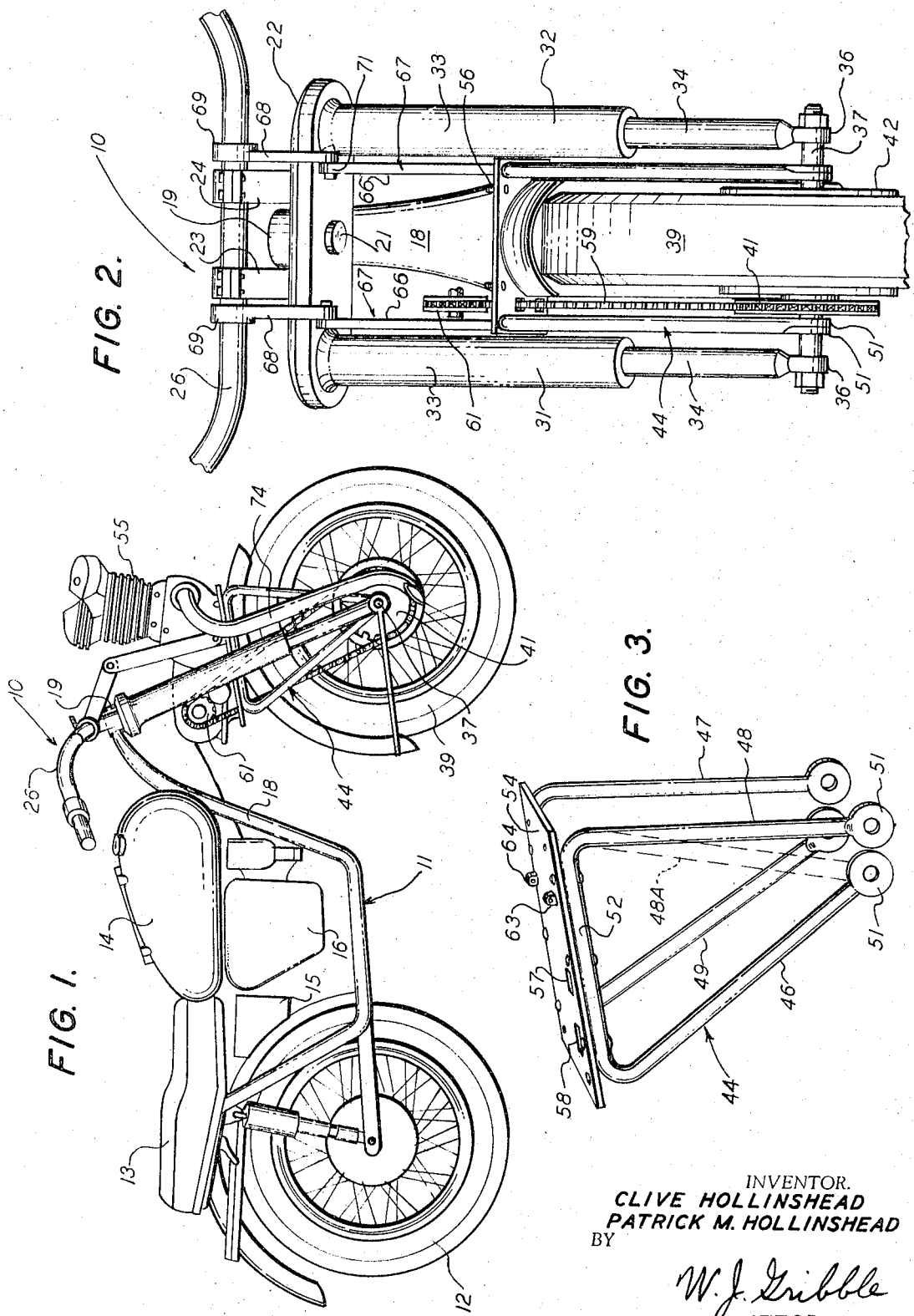
INVENTOR.
CLIVE HOLLINSHEAD
PATRICK M. HOLLINSHEAD
BY
*W. J. Gribble*
ATTORNEY Sept. 12, 1967     C. HOLLINSHEAD ET AL     3,340,947
FRONT WHEEL DRIVE MOTORCYCLE
Filed Aug. 16, 1965     2 Sheets-Sheet 2
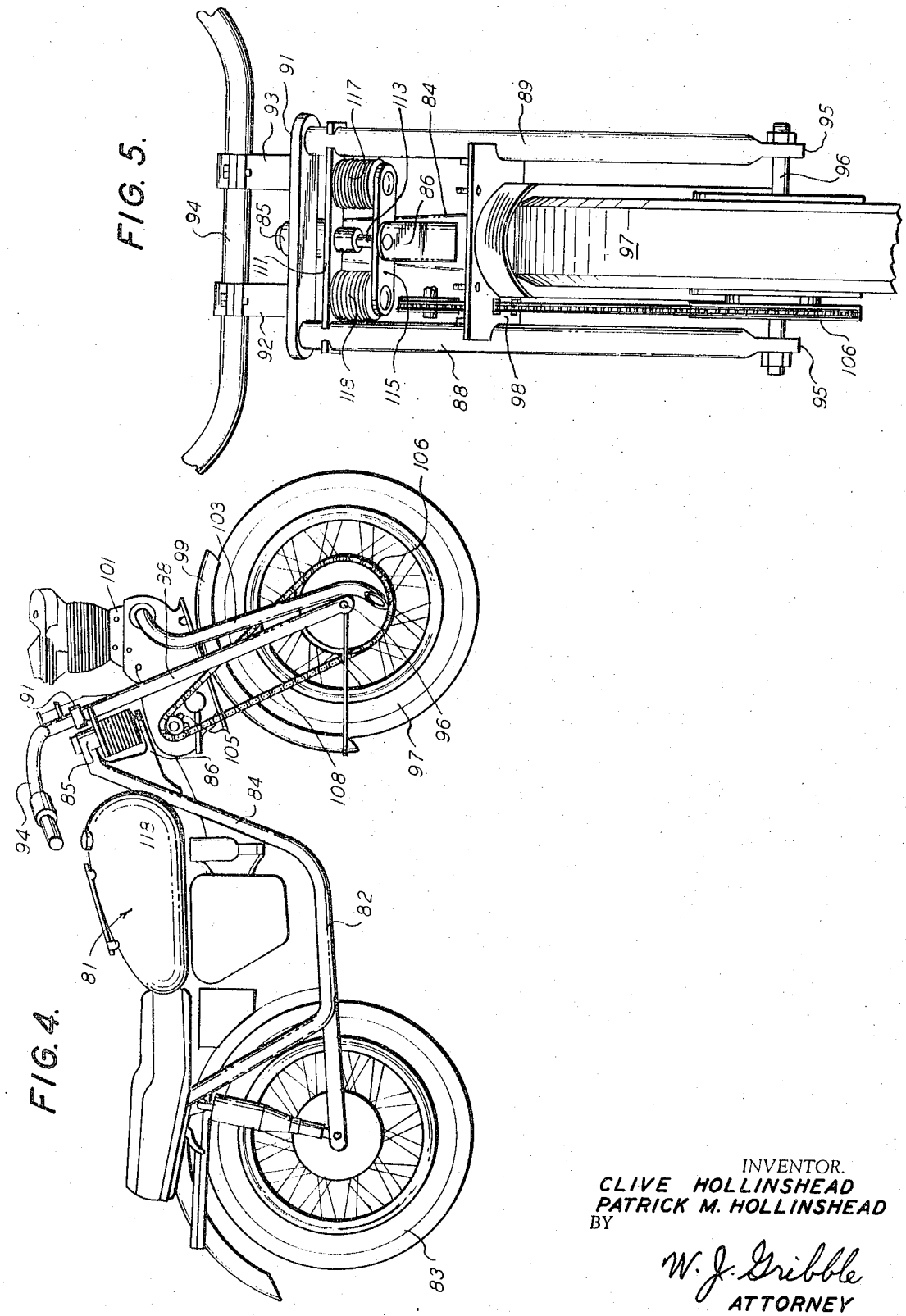
INVENTOR.
CLIVE HOLLINSHEAD
PATRICK M. HOLLINSHEAD
BY
W. J. Gribble
ATTORNEY 3,340,947
FRONT WHEEL DRIVE MOTORCYCLE
Clive Hollinshead and Patrick M. Hollinshead, both of 11407 E. Fredson St., Santa Fe Springs, Calif. 90670
Filed Aug. 16, 1965, Ser. No. 479,848
3 Claims. (Cl. 180—31)

ABSTRACT OF THE DISCLOSURE

A motorcycle having a shock-mounted driven front wheel rotating on a dead axle that supports a motor mount tied to the steering unit by articulated members so as to maintain motor to axle spacial relationship despite relative axle to steering unit displacement.

---

It has long been known that motor vehicles wherein the weight of the motor bears upon the driven wheel or wheels have a greater efficiency than conventional vehicles. However, power transmission problems and steering difficulties, particularly in the case of front wheel drive vehicles, have inhibited general use of vehicles having the propulsion unit largely supported by the driven wheel or wheels.

I have invented a motor-driven vehicle wherein the motive power unit is supported upon the front or steering wheel that overcomes the difficulty of maintaining a fixed linear relationship between the axle of the driven wheel and the motor unit and which still includes shock-absorbing means for flexibility between the driven wheel and the frame bearing the weight of the vehicle rider.

The invention contemplates a motor vehicle comprising front and rear wheels supporting a rider-bearing frame, the rear wheel being an idler wheel at one end of the frame. A forward frame member carries a steering journal. A steering yoke from which spaced fork members depend is connected to the steering journal on the forward frame member. A dead axle extends between the fork members. A driven wheel is journalled on the axle. Platform means between the fork members support a motor in fixed linear relationship to the dead axle. Drive means, such as a sprocket chain, connect the motor and the driven wheel. Shock-absorbing means which may be spring, hydraulic or pneumatic loaded shock absorbers intervene between the vehicle frame and the dead axle to absorb shocks transmitted from the road to the axle through the front wheel.

A preferred embodiment of the invention contemplates shock-absorbing members combined with the fork members and a motor support which lodges between the fork members and transmits the weight of the motor to the dead axle. In this preferred embodiment torque arresting bars articulately connect between the handlebars or other steering mechanism of the vehicle and the motor support to resiliently maintain the arcuate relationship of the motor support to the dead axle.

Another embodiment of the invention contemplates shock-absorbing members that intervene between the steering yoke or an extension thereof and the frame of the vehicle. In both of the referred-to embodiments the shock-absorbing unit or units turn about the steering axis with the turning of the handlebars of the vehicle.

The vehicle of the invention has exceeded conventional vehicles of like power in both acceleration and hillclimbing ability. This is apparently due to the fact that the added mass of the propulsion unit over the driven wheel eliminates much of the driven wheel spinning and dynamic imbalance of conventional machines that interferes with both hillclimbing ability and acceleration.

These and other advantages of the invention are apparent from the following detailed description and drawing in which:

FIG. 1 is a side elevation of a preferred embodiment of the invention;

FIG. 2 is a fragmentary front elevation to a larger scale and with the motor removed, of the embodiment of FIG. 1;

FIG. 3 is a perspective view of the motor mount of the preferred embodiment of the invention;

FIG. 4 is a side elevation of an alternate embodiment of the invention; and

FIG. 5 is a fragmentary front elevation to a larger scale of the embodiment of FIG. 4 with the motor removed for clarity.

In FIGS. 1–3 a front wheel drive motorcycle 10 has a conventional frame 11 which is rearwardly supported by a conventional shock-cushioned rear wheel 12. A seat 13 is fixed to the frame as are the conventional fuel tank 14, oil tank 15, and battery 16.

A front frame member 18 extends upwardly and curves forwardly to a steering journal 19. A pivot 21 which may be mounted in bearings within the steering journal extends downwardly through a steering yoke 22. Handle bar mounts 23, 24 extend upwardly from the steering yoke and fix conventional handlebars 26 in place with respect to the steering yoke.

A pair of spaced fork members 31, 32 extend downwardly from the steering yoke. Each fork member has an upper portion 33, from which a smaller lower portion 34 protrudes. The fork members may be of conventional motorcycle design and have either spring or fluid shock absorbers within the upper portions.

The bottom ends 36 of the lower fork members mount a dead axle 37 that extends between the fork members. A driven front wheel 39 is journalled upon the axle. A conventional chain drive sprocket 41 is fixed to the wheel hub and a conventional brake drum 42 is fixed to the dead axle. The front wheel may have conventional braking means that connect conventionally to handlebar controls which, along with other control components, are not related to the instant invention and, therefore, not shown.

A motor mount 44 whose configuration is best seen in FIG. 3 is supported upon the dead axle. The motor mount comprises a pair of transversely spaced triangular tubular frames 46, 47. Each frame has a forward leg 48 and a rearward leg 49. Each of the legs terminates in a collar 51 adapted to fit about the axle. A generally horizontal support tube 52 connects legs 48, 49 and supports a motor plate 54. Depending in part upon the material of the motor plate, the plate may be brazed, welded or riveted to the support tubes of the frames. A motor 55 (see FIG. 1) may be bolted in place by conventional bolts 56 (FIG. 2) extending upwardly from the motor plate. Chain apertures 57, 58 may extend through the plate at one of its sides to accommodate a drive chain 59 which transmits power between wheel sprocket 41 and a drive sprocket 61 of the motor.

Pivot lugs 63, 64 extend upwardly from the surface of the motor plate and, as shown in FIGS. 1 and 2, each lug connects to a lower arm 66 of a torque arresting assembly 67. Each torque assembly further comprises an upper arm 68 with a collar 69 adapted to fit about handlebar 26 of the cycle. The upper and lower arms of each assembly are pivotally joined at 71 such that the torque arresting assemblies provide for some movement between the handlebar and the motor plate.

Motor 55 may be a conventional twin engine which may have a displacement between 50 cubic centimeters and 200 cubic centimeters in the type of vehicle shown. Exhaust tubes such as the tube 72 shown in FIG. 1 may extend downwardly from the motor on either side alongside the driven wheel.

The embodiment of FIGS. 1–3 affords a front wheel drive vehicle in which the linear relationship of the drive sprocket of the motor and the driven sprocket of the driven wheel is maintained at all times. The motor mount is related to the dead axle about which the wheel turns. The motorcycle frame is resiliently related to the dead axle through the shock absorber action of fork members. Because there is no fixed relationship between the motor mount and the fork members, a shock-absorbing action does not affect the motor-wheel relationship. The torque arresting linkage is articulate so that it may adjust for the differences in linear relationship occuring under road conditions between the motor plate and the steering assembly of the vehicle. The motor is thus maintained in both its radial and arcuate relationship to the driven sprocket within the limits necessary for effective operation, despite the fact that the frame bearing the rider is shielded from front wheel road shocks by the resilient action of the fork members.

FIGS. 4 and 5 show a motor vehicle 81 which has a substantially conventional frame 82 supported in the rear by a rear wheel 83. The frame has a forward frame member 84. The forward member has a steering journal 85. A frame cantilever support 86 extends forwardly of the forward frame member. Transversely spaced rigid front wheel fork members 88, 89 extend downwardly from a steering yoke 91. Handlebar supports 92, 93 rise from the steering yoke. A conventional handlebar 94 is secured within the support. A dead axle 96 extends between the lower ends 95 of the rigid fork members. A driven front wheel 97 is journalled upon the axle. A motor plate 98 is affixed to the fork members in a substantially horizontal attitude directly above a front fender 99. A conventional motorcycle motor 101 is fixed to the motor plate between the forks and forwardly thereof. A conventional exhaust 103 extends from the motor and runs downwardly substantially parallel to the fork members.

The motor has a drive sprocket 105 which is connected to a driven sprocket 106 on the wheel by a conventional sprocket chain 108. Because the forks 88, 89 are rigid forks and because the motor plate is fixed thereto, the motor's linear relationship to the dead axle and therefore the front wheel is maintained such that the motor and the driven sprocket remain in fixed relationship one to the other despite road shocks.

A pivot plate 111 extends between the fork members and is fixed thereto directly beneath the steering yoke 91. The plate extends rearwardly and is journalled about a steering pin 113 which extends between the steering journal 85 and frame cantilever 86. A shock-absorber mounting plate 115 is pivotally mounted with respect to steering pin 113 and is supported by cantilever member 86. A pair of conventional shock absorbers 117, 118 are mounted between the pivot plate and the support plate 115. The shock absorbers resist relative displacement of the forward frame member and the pivot plate and thus the front wheel and tend to damp the transmission of shocks between the frame and the front wheel. This shock-absorbing action, as in the previous embodiment, does not affect the relationship between the drive sprocket of the motor and the driven sprocket of the wheel, preserving proper power transmission.

In both embodiments the motor may be conventionally controlled in terms of both motor speed and drive gear ratios from the handlebars, as is conventional. Little change of existing steering mechanisms need be made to adapt conventional motor-driven vehicles of the type illustrated to the combination of the invention. While only two embodiments of the invention have been disclosed to illustrate the inventive concept, many others will occur to those skilled in the art within the scope of the invention. Variations in the torque arresting bars, and the means of mounting the motor plate and in the types of shock absorbers used are contemplated. Therefore, we wish the embodiments shown to be regarded as illustrative only and desire that the scope of the invention be measured by the appended claims.

We claim:

1. A motor vehicle comprising a frame, a frame-supporting idler wheel at one end of the frame, a steering journal on the frame, a steering yoke, handlebars connected to the steering yoke, fork members depending downwardly from the steering yoke, a dead axle supported by the fork members, a driven wheel journalled on the axle, a motor, means between the fork members and bearing on the dead axle for supporting the motor in fixed spatial relationship to said axle, drive means connecting the motor and the driven wheel, means connecting the steering yoke to the steering journal, torque arresting bars connecting between the handlebars and the motor support means, and shock-absorbing means intervening between the vehicle frame and the dead axle.

2. Apparatus in accordance with claim 1 wherein the torque arresting bars are jointed so as to provide for relative displacement of the means for supporting the motor and the handlebars.

3. Apparatus in accordance with claim 1 wherein the means for supporting the motor comprises a first and a second triangular frame each adapted to be joined to the dead axle at its apex, and a motor base bearing upon the base of both triangular frames above the driven wheel.

References Cited

UNITED STATES PATENTS

| | | | |
|---|---|---|---|
| 709,445 | 9/1902 | Menns et al. | 180—31 |
| 2,486,095 | 10/1949 | Armstrong | 180—33 |
| 2,768,836 | 10/1956 | Hilber | 280—276 |
| 3,155,185 | 11/1964 | Allen et al. | 180—31 |
| 3,219,137 | 11/1965 | Appleton | 180—26 |

FOREIGN PATENTS

| | | |
|---|---|---|
| 682,502 | 10/1939 | Germany. |
| 881,010 | 6/1953 | Germany. |

KENNETH H. BETTS, *Primary Examiner.*